United States Patent [19]

Laurens et al.

[11] Patent Number: 5,298,342
[45] Date of Patent: Mar. 29, 1994

[54] FUEL CELL CROSSOVER ARRESTOR AND PRESSURE SEAL

[75] Inventors: Rene M. Laurens, Naperville; Thomas G. Benjamin, Downers Grove; Robert P. Bachta, Chicago, all of Ill.

[73] Assignee: M-C Power Corporation, Burr Ridge, Ill.

[21] Appl. No.: 964,145

[22] Filed: Oct. 20, 1992

[51] Int. Cl.$^5$ .............................................. H01M 2/08
[52] U.S. Cl. ............................................ 429/35; 429/16
[58] Field of Search .................. 429/35, 16, 29, 30, 429/33, 38, 39

[56] References Cited

U.S. PATENT DOCUMENTS

| 3,012,086 | 12/1961 | Vahldieck . | |
|---|---|---|---|
| 3,514,333 | 5/1970 | Novack | 136/86 |
| 3,589,941 | 6/1971 | Eaton et al. | 136/86 |
| 3,723,186 | 3/1973 | Borucka et al. | 136/153 |
| 3,867,206 | 2/1975 | Trocciola et al. | 136/86 |
| 4,160,067 | 7/1979 | Camara et al. | 429/16 |
| 4,259,389 | 3/1981 | Vine et al. | 428/192 |
| 4,329,403 | 5/1982 | Baker | 429/35 |
| 4,579,788 | 4/1986 | Marianowski et al. | 429/16 |
| 4,609,595 | 9/1986 | Nickols | 429/35 |
| 4,761,348 | 8/1988 | Kunz et al. | 429/35 |
| 4,781,727 | 11/1988 | Mitsuda et al. | 29/623.2 |
| 4,786,568 | 11/1988 | Elmore et al. | 429/44 |
| 4,824,739 | 4/1989 | Breault et al. | 429/13 |
| 4,835,073 | 5/1989 | Kunz | 429/16 |
| 4,963,442 | 10/1990 | Marianowski et al. | 429/13 |
| 4,978,590 | 12/1990 | Granata, Jr. et al. | 429/35 |
| 5,045,413 | 9/1991 | Marianowski et al. | 429/13 |
| 5,077,148 | 12/1991 | Schora et al. | 429/16 |
| 5,084,364 | 1/1992 | Quaadvliet | 429/34 |

*Primary Examiner*—Jose' G. Dees
*Assistant Examiner*—Samuel L. Barts
*Attorney, Agent, or Firm*—Speckman, Pauley & Fejer

[57] ABSTRACT

A fuel cell electrolyte with an electrochemically inactive matrix, an electrochemically active electrolyte, and a substantially gas impervious metallic foil in the central region of the thickness of the electrolyte extending around its periphery over at least a portion of the fuel cell peripheral seal area and into the electrolyte active area reducing gas crossover between the anode and cathode chambers. The gas impervious metallic foil may extend beyond the periphery of the electrolyte into the fuel cell peripheral seal area and have a resilient gasket on each side forming the fuel cell peripheral seal with seal structures extending from separator plates, thereby eliminating conventional electrolyte wet seals. The seal structures according to this invention are also suitable for sealing internal manifolds in fuel cell stacks.

34 Claims, 3 Drawing Sheets

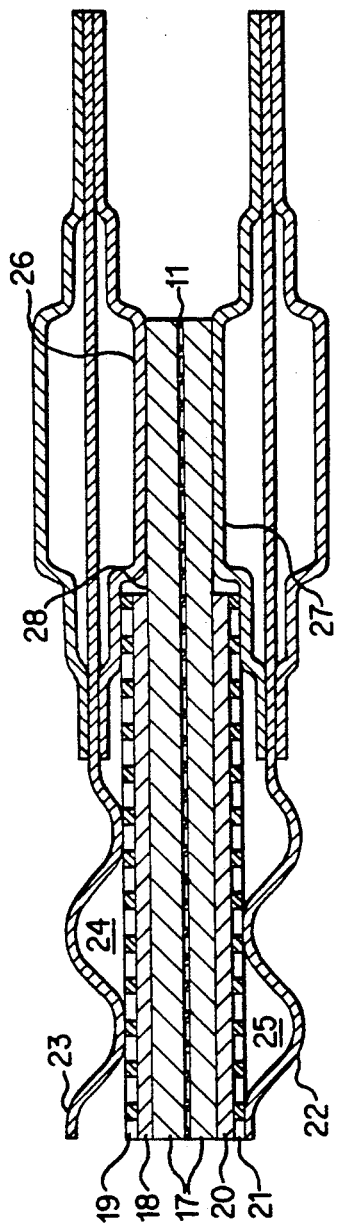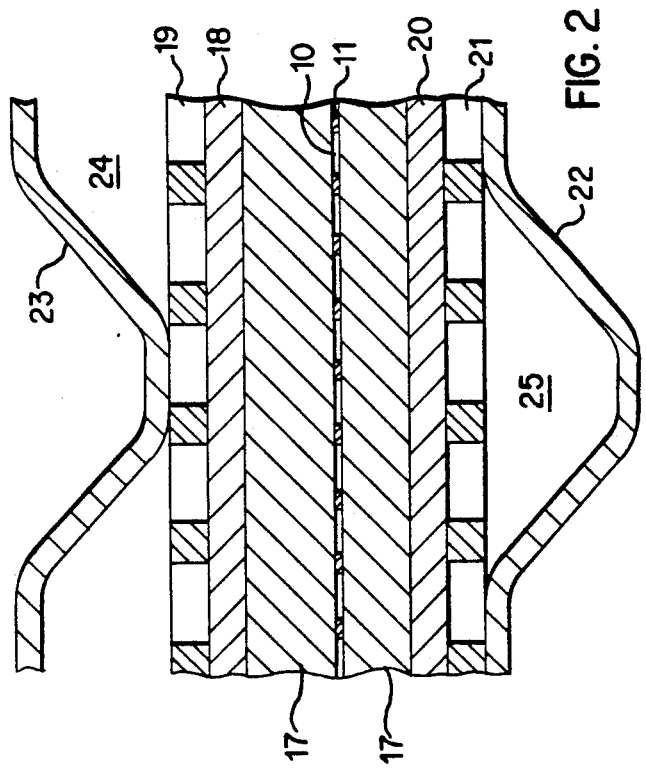

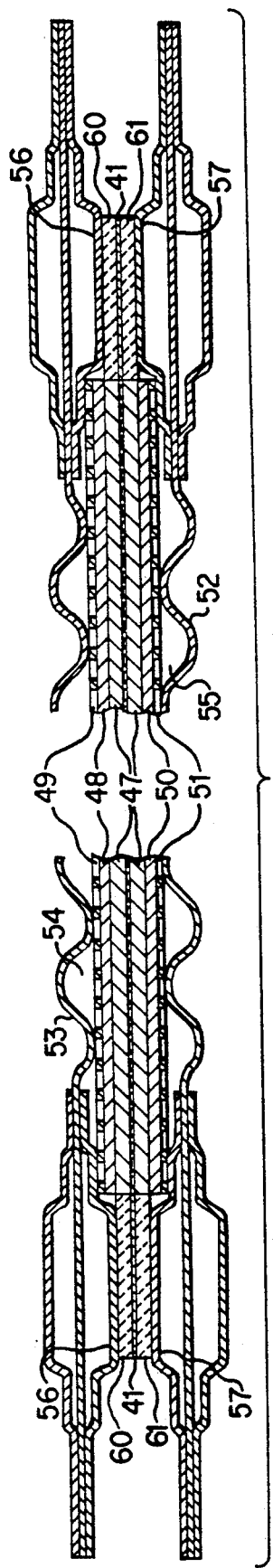
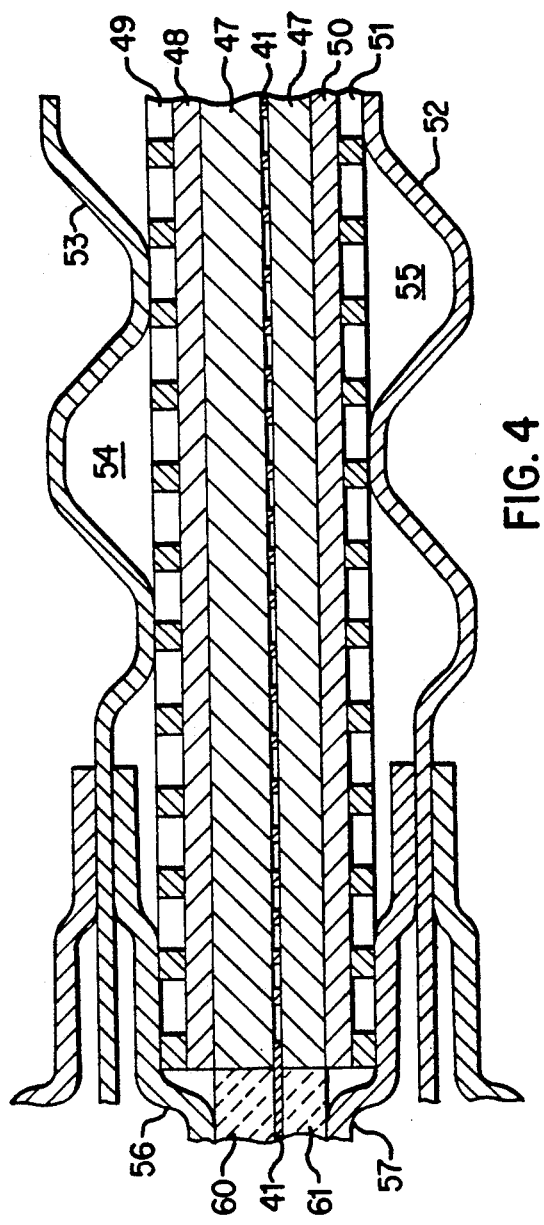

FUEL CELL CROSSOVER ARRESTOR AND PRESSURE SEAL

BACKGROUND OF THE INVENTION

1. Field of the Invention

This invention relates to fuel cells, and in particular, to reduction of gas crossover between anode and cathode compartments and elimination of wet seals in molten alkali metal carbonates electrolyte fuel cells. This invention is applicable to both internal and external manifolded fuel cells and is particularly applicable to molten alkali metal carbonates electrolyte and lower temperature fuel cells.

2. Description of Related Art

Generally, fuel cell electrical output units are comprised of a stacked multiplicity of individual cells separated by inert or bi-polar electronically conductive separator plates. Individual cells are sandwiched together and secured into a single stacked unit to achieve desired fuel cell energy output. Each individual cell generally includes an anode and cathode electrode, an electrolyte matrix, and a fuel and oxidant gas source. Both fuel and oxidant gases ar introduced through manifolds to their respective reactant chambers between the separator plate and the electrolyte matrix. The area of contact between the electrolyte and other cell components to maintain separation of the fuel and oxidant gases and prevent and/or minimize gas leakage is known as the wet seal. A major factor attributing to premature fuel cell failure is corrosion and fatigue in the wet seal area. This failure is hastened by corrosive electrolyte contact at high temperatures and high thermal stresses resulting from large temperature variations during thermal cycling of the cell causing weakening of the structure through intracrystalline and transcrystalline cracking. Electrolyte cracking is particularly prone to occur in areas where the electrolyte may not be fully mechanically supported by adjacent structures, such as electrodes, as occurs immediately interior to the peripheral wet seal in many of the present fuel cell configurations. Such failures permit undesired fuel and/or oxidant gas crossover and overboard gas leakage which interrupts the intended oxidation and reduction reactions thereby causing breakdown and eventual stoppage of cell current generation. Under high temperature fuel cell operating conditions, in the range of about 500° to 700° C., molten carbonate electrolytes are very corrosive to ferrous metals which, due to strength requirements, are necessary for fuel cell housings and separator plates. The high temperature operation of stacks of molten carbonate fuel cells increases both the corrosion and thermal stress problems in the wet seal area, especially when the thermal coefficients of expansion of adjacent materials are different.

Commercially viable molten carbonate fuel cell stacks may contain up to about 600 individual cells each having a planar area in the order of ten square feet. In stacking such individual cells, separator plates separate the individual cells with fuel and oxidant each being introduced between a set of separator plates the fuel being introduced between one face of a separator plate and the anode side of an electrolyte matrix and oxidant being introduced between the other face of the separator plate and the cathode side of a second electrolyte matrix.

The problems of manifolding and sealing become more severe when larger number of cells and larger planar areas are used in the cell stack. When greater number of cells are used the electrical potential driving the carbonate in the seal area along the height of the stack increases, and when the planar area of the cell increases, the linear tolerances of each component and the side alignment of each component becomes extremely difficult to maintain in order to maintain the mating surface sealed between the manifold/manifold gasket/and cell stack. Cell stacks containing 600 cells can be approximately 10 feet tall presenting serious problems of required stiffness of external manifolds and the application of a clamping force required to force the manifold onto the cell stack. Due to the thermal gradients between cell assembly and cell operating conditions, differential thermal expansions, and the necessary strength of materials used for the manifolds, close tolerances and very difficult engineering problems are presented.

Conventionally, stacks of individual molten carbonate fuel cells have been constructed with spacer strips around the periphery of a separator plate to form wet seals and to provide intake and exhaust manifolds. Various means of sealing in the environment of the high temperature fuel cell wet seal area are disclosed in U.S. Pat. No. 4,579,788 teaching the wet seal strips are fabricated utilizing powder metallurgy techniques; U.S. Pat. No. 3,723,186 teaching the electrolyte itself is comprised of inert materials in regions around its periphery to establish an inert peripheral seal between the electrolyte and frame or housing; U.S. Pat. No. 4,160,067 teaching deposition of inert materials onto or impregnated into the fuel cell housing or separator in wet seal areas; U.S. Pat. No. 3,867,206 teaching a wet seal between electrolyte-saturated matrix and electrolyte saturated peripheral edge of the electrodes; U.S. Pat. No. 4,761,348 teaching peripheral rails of gas impermeable material to provide a gas sealing function to isolate the anode and cathode from the oxidant and fuel gases, respectively; U.S. Pat. No. 4,609,595 teaching spring loaded resilient seals around the periphery of the separator plate to form wet seals for gas tightness of molten carbonate fuel cells; U.S. Pat. No. 5,084,364 teaching springs around the active portion of a cell matched to the compression of the wet seal rail structure; U.S. Pat. No. 4,329,403 teaching graded electrolyte composition for more gradual transition in the coefficient of thermal expansion in passing from the electrodes to the inner electrolyte region; and U.S. Pat. No. 3,514,333 teaching housing of alkali metal carbonate electrolytes in high temperature fuel cells by use of a thin aluminum sealing gasket. U.S. Pat. No. 4,835,073 teaches a thin metal film of material which is poorly wet by the electrolyte sandwiched between ceramic blocks and extending beyond the exterior dimensions of the cell or cell stack to block electrolyte creepage adjacent the anode of an individual cell or at the anode end of a fuel cell stack.

Gas sealing of a phosphoric acid fuel cell, which operates at about 150° to 220° C., by filling the pores of a porous material periphery of the cell constituents with silicon carbide and/or silicon nitride is taught by U.S. Pat. No. 4,781,727; and by impregnating interstitial substrate plate edge is taught by U.S. Pat. Nos. 4,786,568 and 4,824,739. The solution of sealing and corrosion problems encountered in low temperature electrolytic cells, such as bonding granular inert material with polytetrafluoroethylene as taught by U.S. Pat. No. 4,259,389; gaskets of polyethylene as taught by U.S.

Pat. No. 3,012,086; "O" ring seals taught by U.S. Pat. No. 3,589,941 for internal manifolding of fuel only; and an anode seal frame of Teflon taught by U.S. Pat. No. 4,978,590 are not suitable for high temperature molten carbonate fuel cells.

U. S. Pat. Nos. 4,963,442 and 5,045,413 teach fully internal manifolded fuel cell stacks wherein the electrolytes and separator plates extend to the edge of the fuel cell stack and form a peripheral wet seal by the separator plate having a flattened wet seal structure extending from each face of the separator plate to contact the electrolytes completely around their periphery to form a separator plate/electrolyte wet seal under fuel cell operating conditions The electrolytes and separator plates each have a plurality of aligned perforations, the perforations in the separator plates each being surrounded by a flattened manifold wet seal structure extending from each face of the separator plate to contact the electrolytes to form a separator plate/electrolyte wet seal under fuel cell operating conditions thereby providing a plurality of manifolds extending through the fuel cell stack for fully internal manifolding of fuel and oxidant gases to and from each unit fuel cell in the fuel cell stack. U. S. Pat. No. 5,077,148 teaches a fully internal manifolded and internal reformed fuel cell stack having separator plate/electrolyte seals similar to those taught by U. S. Pat. Nos. 4,963,442 and 5,045,413 and having interspersed along its axis a plurality of reforming chambers formed by adjacent separator plates to provide fully internal manifolding of reactant gas and steam to product ga from each reformer unit in the fuel cell stack.

SUMMARY OF THE INVENTION

It is an object of this invention to provide high temperature fuel cell stacks having increased long term stability.

Another object of this invention is to reduce gas crossover between anode and cathode chambers in high temperature fuel cells.

Still another object of this invention is to eliminate electrolyte pumping in both internal and external manifolded high temperature fuel cells.

It is another object of this invention to provide high temperature fuel cell structures which do not require electrolyte wet seals for electrolyte containment.

Another object of this invention is to reduce cell-to-cell voltage differences in high temperature fuel cell stacks.

It is yet another object of this invention to provide fuel cell structures which permit greater component tolerances in manufacture, assembly and operation.

It is another object of this invention to provide improved sealing between fuel cell anode and cathode compartments.

These and other objects and advantages of this invention which will become apparent upon reading the detailed description may be achieved by providing in the unit cells of a high temperature fuel cell stack a substantially gas impervious metallic foil in the central region of the thickness of the electrolyte structures extending over at least a portion of the peripheral seal area and into the electrolyte active area.

BRIEF DESCRIPTION OF THE DRAWINGS

The above objects and advantages of this invention will become further apparent upon reading the detailed description and reference to the drawing wherein:

FIG. 1 is a cross sectional view of the peripheral portion of a fuel cell according to one embodiment of this invention;

FIG. 2 is an enlarged cross sectional view of an active portion of the fuel cell shown in FIG. 1;

FIG. 3 is a broken sectional view of another embodiment of a fuel cell according to this invention;

FIG. 4 is an enlarged cross sectional view of a peripheral portion of the fuel cell shown in FIG. 3;

DESCRIPTION OF PREFERRED EMBODIMENTS

Figure 5:
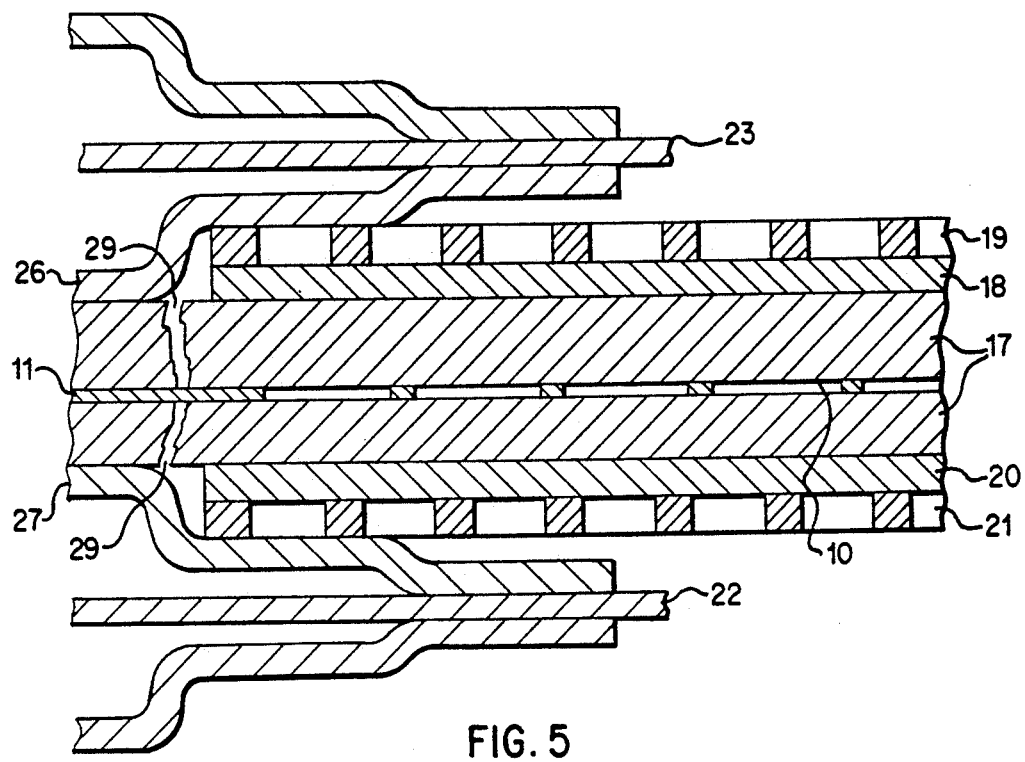
FIG. 5 is an enlarged cross sectional view of a peripheral portion of the fuel cell shown in FIGS. 1 and 2.

The cross over barriers and pressure seal membranes of this invention are suitable for use in fuel cells and fuel cell stacks of any type having generally planar components, especially high temperature fuel cells such as molten alkali metal carbonates electrolyte fuel cells. Exemplary of such fuel cell units and stacks together with their components have been described in more detail in U. S. Pat. Nos. 4,963,442, 5,045,413 and 5,077,148 which are incorporated herein in their entirety by reference. These patents describe suitable anode, cathode, current collector, electrolyte, and separator plate components and their configurations, materials and functioning which is the same as practiced in this invention except with respect to the electrolyte having a metallic foil through the central region of its thickness extending around its periphery over at least a portion of the peripheral seal area and into the electrolyte active area, as will be more fully described below. The other cell components may by varied in a number of ways, which will be apparent to one skilled in the art. The electrolytes of this invention may be used in internally or externally manifolded fuel cell stacks and are especially suitable for use in fully internally manifolded fuel cell stacks and in internal reformed fuel cell stacks as described in the above patents. Electrolytes of this invention may be used in fuel cell stacks of any shape or configuration.

This invention is concerned with prevention of gas crossover between the anode and cathode compartments and containment of active electrolyte within the active region of the cell. This invention is particularly concerned with gas-tight sealing in the peripheral seal areas and in seal areas surrounding internal manifolds.

FIG. 1 is a cross sectional view of the peripheral portion of a fuel cell using an electrolyte according to one embodiment of this invention showing a peripheral wet seal between the electrolyte and separator plates and FIG. 2 is an enlarged cross sectional view of an active portion of the fuel cell shown in FIG. 1, neither figure drawn to scale. FIGS. 1 and 2 show a molten alkali metal carbonates electrolyte fuel cell assembled with electrolyte 17 which upon cell start-up becomes a paste of electrolyte matrix and active electrolyte alkali metal carbonates. In the central region of the thickness of electrolyte 17 a gas crossover barrier which is shown as substantially gas impervious metallic foil 11 extends around the periphery of electrolyte 17 in at least a portion of its peripheral seal area. The gas crossover barrier must be gas impervious in all seal areas, but must not hinder gas passage in active cell areas, as shown by openings 10 in the active cell area shown in FIG. 2. As shown in FIG. 1, the entire electrolyte 17, including metallic foil 11, extends to the outer edge of the flattened surfaces of seal structures 26 and 27 which extend toward each other from separator plates 23 and 22, respectively Peripheral seal structures extend around the periphery of the active area of the fuel cell to provide electrolyte containment and similar seal structures may extend around similarly constructed internal manifolds to prevent electrolyte or gas leakage Various configurations of suitable peripheral seal and manifold seal structures have been more fully described in the above identified patents incorporated herein by reference As shown in FIG. 1, a conventional wet seal is formed between electrolyte 17 and seal structures 26 and 27. Cathode 18 is adjacent one side of electrolyte 17 with its current collector 19 and forms, with corrugated separator plate 23, cathode chambers 24. Anode 20 is adjacent the opposite side of electrolyte 17 with its current collector 21 and forms, with corrugated separator plate 22, anode chambers 25. In the embodiment shown in FIG. 1, the electrodes and current collectors stop inwardly from where seal structures 26 and 27 contact electrolyte 17 to form the wet seal. This is the configuration both adjacent the peripheral seal and seals around internal manifolds. This spacing between the ends of the electrodes and current collectors and the seal structures results from manufacturing tolerances and tolerances necessary for cell assembly. However, this spacing creates unsupported electrolyte regions 28 which are especially susceptible to electrolyte cracking and resulting undesired gas crossover between the anode and cathode compartments.

FIG. 5 is an enlarged cross sectional view of a peripheral portion of the fuel cell shown in FIG. 1 showing electrolyte crack 29 in unsupported electrolyte regions 28, as shown in FIG. 1, with gas impervious metallic foil 11 remaining intact and continuous in the crack region, thereby preventing gas crossover between the anode and cathode chambers. It is an important feature of this invention that the gas impervious metallic foil be located in the central region of the thickness of the electrolyte. By the terminology central region is meant anywhere in the thickness of the electrolyte interior to its face surfaces. The gas impervious metallic foil is preferably located within about the central 50 percent of the electrolyte thickness, and most preferably within about the central 30 percent of the electrolyte thickness to provide the greatest amount of mechanical reinforcing or strengthening of the electrolyte structure. The gas impervious metallic foil should extend over at least a portion of the seal area, preferably over more than about 50 percent of the seal area, and most preferably over the entire seal area, both in the case of peripheral seals and in the case of manifold seals. The gas impervious metallic foil should also extend inwardly from the seal area into the active area of the electrolyte in order to extend in the electrolyte across unsupported electrolyte regions between seal regions and the edges of electrolyte supporting electrodes and current collectors. The gas impervious metallic foil should extend inwardly of the ends of the electrodes at least about the distance of the unsupported width between the seal area and the electrode. In preferred embodiments, the gas impervious metallic foil extends at least about 3 wet seal widths inwardly of the internal wet seal edge, thereby providing structural support by both the electrodes and the metallic foil in these regions while minimizing blockage of the cell active area.

Figures 6, 7, 8:
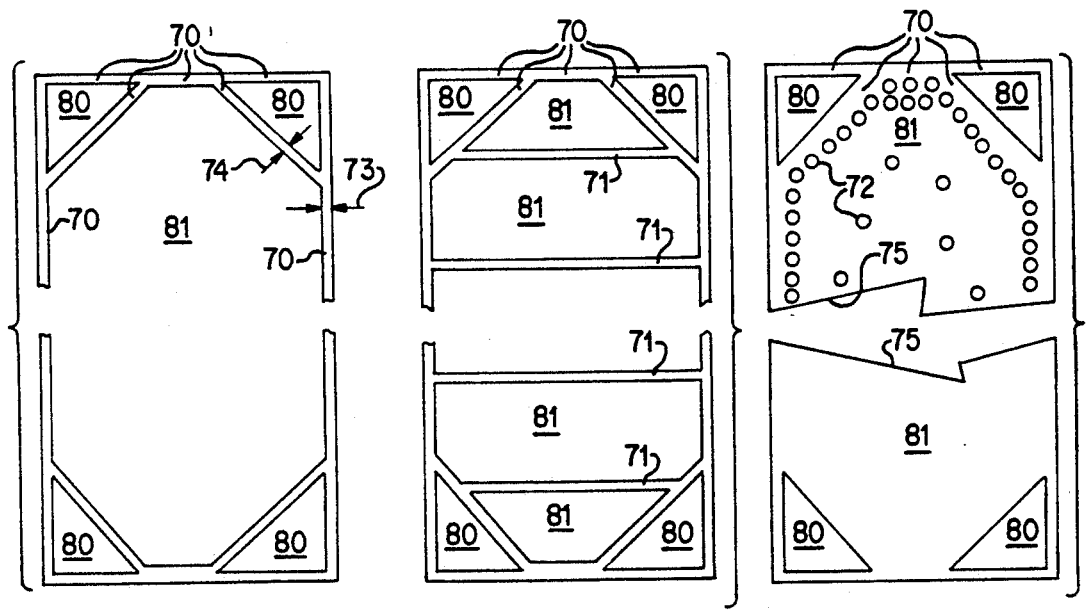
FIGS. 6, 7 and 8 are plan views of various embodiments of cross-over barriers according to this invention.

In the electrochemically active areas of the electrolyte, except immediately adjacent seals as described above, it is desirable that the metallic foil provide as unimpeded ionic and desired chemical passage as possible so as not to interfere with the desired electrochemical reactions. FIGS. 6, 7 and 8 show exemplary plan views of metallic foils suitable for use in electrolytes according to this invention. FIG. 6 shows the simplest metallic foil plan having gas impervious metallic foil sealing areas 70 as a peripheral seal around the periphery of the fuel cell and around the periphery of internal manifolds 80. The width 73 of the gas impervious metallic foil in peripheral seal areas and the width 74 of the gas impervious metallic foil in manifold seal areas is at a minimum at least a portion of the wet seal area and extending into the electrochemically active cell area as described above The respective widths may be increased to provide sufficient surface area to resist blow out of the membrane due to pressure differences between the anode and cathode chambers and the ambient or manifold pressures. In the embodiment shown in FIG. 6, there is substantially no impedance of ionic or chemical movement by the metallic foil in the electrochemically active area of the cell. To reduce the blowout potential and to improve the mechanical strength of the metallic foil, FIG. 8 shows a metallic foil which covers the entire cell area except for internal manifolds 80. In the entire active cell area 81, except where the gas impervious metallic foil extends into the active area as described above, the metallic foil has perforations or holes 72 such that the open area provides free passage of ions and chemicals for fuel cell operation in perforated active are 75. FIG. 7 shows another suitable plan view of a gas impervious metallic foil for use in the electrolyte of this invention which is similar to the plan shown in FIG. 6, but has spaced strengthening ribs 71 to strengthen the membrane against blow out while providing an essentially open area in the electrochemically active area of the cell.

From the above specific examples and description, it is readily apparent that a wide number of configurations of metallic foils accommodating any desired fuel cell design with or without internal manifolding and/or internal reforming are all within the scope of this invention. An important aspect of this invention is that the electrolyte have a substantially gas impervious metallic foil in the central region of its thickness extending around its periphery over at least a portion of the peripheral seal area and into its active area, thereby reducing or eliminating gas crossover between anode and cathode chambers.

Suitable metallic foil materials are any metallic materials which withstand corrosion by the specific fuel cell chemicals, are substantially gas impermeable and act as a barrier to anode and cathode gases, have mechanical strength to prevent bursting as a result of fuel cell normal pressure differentials and reasonable pressure upset conditions, and be cost effective. The metallic foils may be of pure metallic elements, alloys, laminations and the like. Exemplary metallic foil materials include nickel, gold, silver, aluminum and copper. A preferred material for use in molten alkali metal carbonates electrolyte fuel cells is a pure nickel foil. The metallic foil should be as thin as is consistent with required mechanical strength and to render it substantially impervious to gas passage. Thicknesses of about 1 to about 10 mil, preferably about 1 to about 3 mil, foil are suitable for use in molten alkali metal carbonates electrolyte fuel cell stacks.

An embodiment of the crossover arrestor of this invention which eliminates the electrolyte wet seals is shown in FIGS. 3 and 4. In this embodiment, electrolyte 47 has substantially gas impervious metallic foil 41 in the central region of the thickness of electrolyte 47 with foil 41 extending beyond the periphery of electrolyte 47 into the fuel cell peripheral seal area and into the fuel cell active area. In this embodiment, electrolyte 47, electrodes 48 and 50, and current collectors 49 and 51 all have the same overall size and the same dimensions at internal manifolds so that the electrolyte is fully supported over its entire area by the electrodes, current collectors and metallic foil 41. As shown in FIGS. 3 and 4, resilient gasket 61 is between one side of metallic foil 41 and seal structure 5 extending from separator plate 52 to form a seal for gases in anode compartment 55, and resilient gasket 60 is between the opposite side of metallic foil 41 and seal structure 56 extending from separator plate 53 to form a seal for gases in cathode compartment 54. This structure for sealing is suitable for both cell peripheral seals and for seals around internal manifolds. In this embodiment, the gas impervious metallic foil should extend over at least a portion of the seal area, preferably over more than about 50 percent of the seal area, and most preferably over the entire seal area, both in the case of peripheral seals and in the case of internal manifold seals. The gas impervious metallic foil should also extend inwardly from the seal area into the active area of the electrolyte to prevent gas crossover between the seal area and the edge of the electrolyte and to provide added reinforcement to the electrolyte edge areas. The gas impervious metallic foil should extend inwardly from the internal edges of the wet seal at least about three wet seal widths. It is preferred that resilient gaskets 60 and 61 fit firmly against the edges of the electrolyte matrix, when the fuel cell or fuel cell stack is clamped together under pressure, and cover the entire width of the flattened portion of seal structures 56 and 57 for best effectiveness. Resilient gaskets may be of any resilient material which withstands the high cell operating temperatures and the electrolyte chemical environment, such as molten alkali metal carbonates, and provide resistance to an oxidizing environment at the edges. Suitable materials include zirconia, high density lithium aluminate having negligible porosity, and other such ceramic materials. Metallic type gaskets may also be used provided that at least one of the contact surfaces is electrically non conductive to prevent shunt currents or short circuiting. The resilient gaskets must be appropriately sized and of sufficient resistance to provide suitable thickness, when compressed under fuel cell or fuel cell stack clamping pressure, for the active cell components.

Elimination of electrolyte wet seals, as is possible using the resilient gasket/gas impermeable metallic foil seals described above, is very attractive since a primary source of gas leakage in a molten alkali metal carbonates fuel cell stack occurs at manifold wet seal areas. Also, the maximum pressure drop allowable across the fuel cell is determined by the strength of the wet seal and greater strength of the resilient gasket/gas impermeable metallic foil sealing used in this invention could provide use of higher pressure drops across the fuel cell. Further, use of resilient gasket/gas impermeable metallic foil sealing according to this invention allows the electrolyte, electrodes, and current collectors to be of the same overall dimensions providing cost savings in manufacture and easier assembly with reduced tolerances over those necessary using conventional electrolyte wet seals.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of the invention.

We claim:

1. In a fuel cell stack comprising a plurality of fuel cell units, each said fuel cell unit comprising an anode, a cathode, an electrolyte in contact on one side with the electrolyte facing face of said anode and in contact on its opposite side with the electrolyte facing face of said cathode, and a separator plate separating said cell units between an anode and a cathode forming an anode chamber between the anode facing face of said separator plate and said anode and forming a cathode chamber between the opposite cathode facing face of said separator plate and the cathode of an adjacent said fuel cell unit, said anode chamber in gas communication with fuel gas supply and outlet means and said cathode chamber in gas communication with oxidant gas supply and outlet means, said fuel cell unit having a peripheral seal to maintain substantially gas-tight relation of said unit cell, the improvement comprising: said electrolyte having a substantially gas impervious metallic foil in the central region of its thickness extending around its periphery over at least a portion of said peripheral seal area and into the electrolyte active area reducing gas crossover between said anode and cathode chambers while providing passage of ions and chemicals for fuel cell operation in said electrolyte active area.

2. In a fuel cell stack according to claim 1 wherein said gas impervious metallic foil is in the central 50 percent of said electrolyte thickness.

3. In a fuel cell stack according to claim 1 wherein said gas impervious metallic foil is in the central 30 percent of said electrolyte thickness.

4. In a fuel cell stack according to claim 1 wherein said gas impervious metallic foil extends over more than about 50 percent of said peripheral seal area.

5. In a fuel cell stack according to claim 1 wherein said gas impervious metallic foil extends over the entire said peripheral seal area.

6. In a fuel cell stack according to claim 1 wherein said gas impervious metallic foil extends inwardly from said peripheral seal at least three times the width of said peripheral seal.

7. In a fuel cell stack according to claim 1 wherein said gas impervious metallic foil is about 1 to about 10 mils thick and principally comprises a material selected from the group consisting of nickel, gold, silver, aluminum and copper.

8. In a fuel cell stack according to claim 1 wherein said gas impervious metallic foil is nickel about 1 to about 3 mils thick.

9. In a fuel cell stack according to claim 1 wherein said peripheral seal is a wet seal between molten alkali metal carbonates electrolyte and said separator plate.

10. In a fuel cell stack according to claim 1 wherein said peripheral seal is a dry resilient gasket between said gas impervious metallic foil and said separator plate.

11. In a fuel cell stack according to claim 1 wherein said gas impervious metallic foil additionally extends over at least a portion of internal manifold seal areas around a plurality of internal manifolds.

12. In a fuel cell stack according to claim 1 wherein said gas impervious metallic foil is in the central 30 percent of said electrolyte thickness, extends over the entire said peripheral seal area, is about 1 to about 10 mils thick and principally comprises a material selected from the group consisting of nickel, gold, silver, aluminum and copper, and said peripheral seal is a wet seal between molten alkali metal carbonates electrolyte and said separator plate.

13. In a fuel cell stack according to claim 12 wherein said gas impervious metallic foil additionally extends over at least a portion of internal manifold seal areas around a plurality of internal manifolds.

14. In a fuel cell stack according to claim 1 wherein said gas impervious metallic foil is in the central 30 percent of said electrolyte thickness, extends over the entire said peripheral seal area, is about 1 to about 10 mils thick and principally comprises a material selected from the group consisting of nickel, gold, silver, aluminum and copper, and said peripheral seal is a dry resilient gasket between said gas impervious metallic foil and said separator plate.

15. In a fuel cell stack according to claim 14 wherein said gas impervious metallic foil additionally extends over at least a portion of internal manifold seal areas around a plurality of internal manifolds.

16. A fuel cell electrolyte structure comprising an electrochemically inactive matrix, an electrochemically active electrolyte, and a substantially gas impervious metallic foil in the central region of the thickness of said electrolyte extending around the periphery of said electrolyte over at least a portion of the electrolyte peripheral seal area and into the electrolyte active area while providing passage of ions and chemicals for fuel cell operation in said electrolyte active area.

17. A fuel cell electrolyte structure according to claim 16 wherein said gas impervious metallic foil is in the central 50 percent of the thickness of said electrolyte.

18. A fuel cell electrolyte structure according to claim 16 wherein said gas impervious metallic foil is in the central 30 percent of the thickness of said electrolyte.

19. A fuel cell electrolyte structure according to claim 16 wherein said gas impervious metallic foil extends over more than about 50 percent of said peripheral seal area.

20. A fuel cell electrolyte structure according to claim 16 wherein said gas impervious metallic foil extends over the entire said peripheral seal area.

21. A fuel cell electrolyte structure according to claim 16 wherein said gas impervious metallic foil extends inwardly from said peripheral seal area at least three times the width of said peripheral seal area.

22. A fuel cell electrolyte structure according to claim 16 wherein said gas impervious metallic foil is about 1 to about 10 mils thick and principally comprises a material selected from the group consisting of nickel, gold, silver, aluminum and copper.

23. A fuel cell electrolyte structure according to claim 16 wherein said gas impervious metallic foil is nickel about 1 to about 3 mils thick.

24. A fuel cell electrolyte structure according to claim 16 wherein said gas impervious metallic foil additionally extends over at least a portion of internal manifold seal areas.

25. A fuel cell electrolyte structure according to claim 16 wherein said gas impervious metallic foil has strengthening ribs extending from one side to an opposite side across the active electrolyte area.

26. A fuel cell electrolyte structure according to claim 16 wherein said gas impervious metallic foil is continuous with perforations over the active electrolyte area.

27. A fuel cell electrolyte structure according to claim 16 wherein said gas impervious metallic foil is in the central 30 percent of the thickness of a molten alkali metal carbonates electrolyte, extends over the entire peripheral seal area, is about 1 to about 10 mils thick and principally comprises a material selected from the group consisting of nickel, gold, silver, aluminum and copper.

28. A fuel cell electrolyte structure according to claim 27 wherein said gas impervious metallic foil additionally extends over at least a portion of internal manifold seal areas.

29. A fuel cell crossover arrestor and pressure seal comprising a substantially gas impervious metallic foil in the central region of the thickness of a fuel cell electrolyte and extending around the electrolyte periphery over at least a portion of the fuel cell peripheral seal area and into the electrolyte active area reducing gas crossover between the fuel cell anode and cathode chambers while providing passage of ions and chemicals for fuel cell operation in said electrolyte active area.

30. A fuel cell crossover arrestor and pressure seal according to claim 29 wherein said gas impervious metallic foil is in the central 50 percent of said electrolyte thickness.

31. A fuel cell crossover arrestor and pressure seal according to claim 29 wherein said gas impervious metallic foil is about 1 to about 10 mils thick and principally comprises a material selected from the group consisting of nickel, gold, silver, aluminum and copper.

32. A fuel cell crossover arrestor and pressure seal according to claim 29 wherein said gas impervious metallic foil is nickel about 1 to about 3 mils thick.

33. A fuel cell crossover arrestor and pressure seal according to claim 29 wherein said gas impervious metallic foil has strengthening ribs extending from one side to an opposite side across open active electrolyte area.

34. A fuel cell crossover arrestor and pressure seal according to claim 29 wherein said gas impervious metallic foil is continuous with perforations over the entire active electrolyte area.

* * * * *